United States Patent [19]
Clyne et al.

[11] Patent Number: 6,021,967
[45] Date of Patent: Feb. 8, 2000

[54] SEALING ASSEMBLY FOR A COAL PULVERIZER

[75] Inventors: Douglas O. Clyne, Yale; David K. Lashbrook, Clyde Township, both of Mich.

[73] Assignee: The Detroit Edison Company, Detroit, Mich.

[21] Appl. No.: 08/979,360

[22] Filed: Nov. 26, 1997

[51] Int. Cl.[7] .................................................. B02C 15/04
[52] U.S. Cl. ......................................................... 241/121
[58] Field of Search ........................... 241/216, 117–121; 277/539, 543

[56] References Cited

U.S. PATENT DOCUMENTS 3,874,677  4/1975  Ludwig et al. .
5,039,115  8/1991  Herbert et al. .
5,306,022  4/1994  Bourque .

FOREIGN PATENT DOCUMENTS 318793    9/1929  United Kingdom .
2 108007  5/1983  United Kingdom .
2 130 918 6/1984  United Kingdom .

Primary Examiner—Mark Rosenbaum
Attorney, Agent, or Firm—Reising, Ethington, Barnes, Kisselle, Learman & McCulloch, PC

[57] ABSTRACT

A packing for preventing leakage of air between a rotating yoke of a coal pulverizer and an annular seal surrounding an extension of the yoke. The packing is a ring of compressible graphite. A band encircles the graphite ring and clamps it tightly against the yoke extension and against the seal.

5 Claims, 2 Drawing Sheets

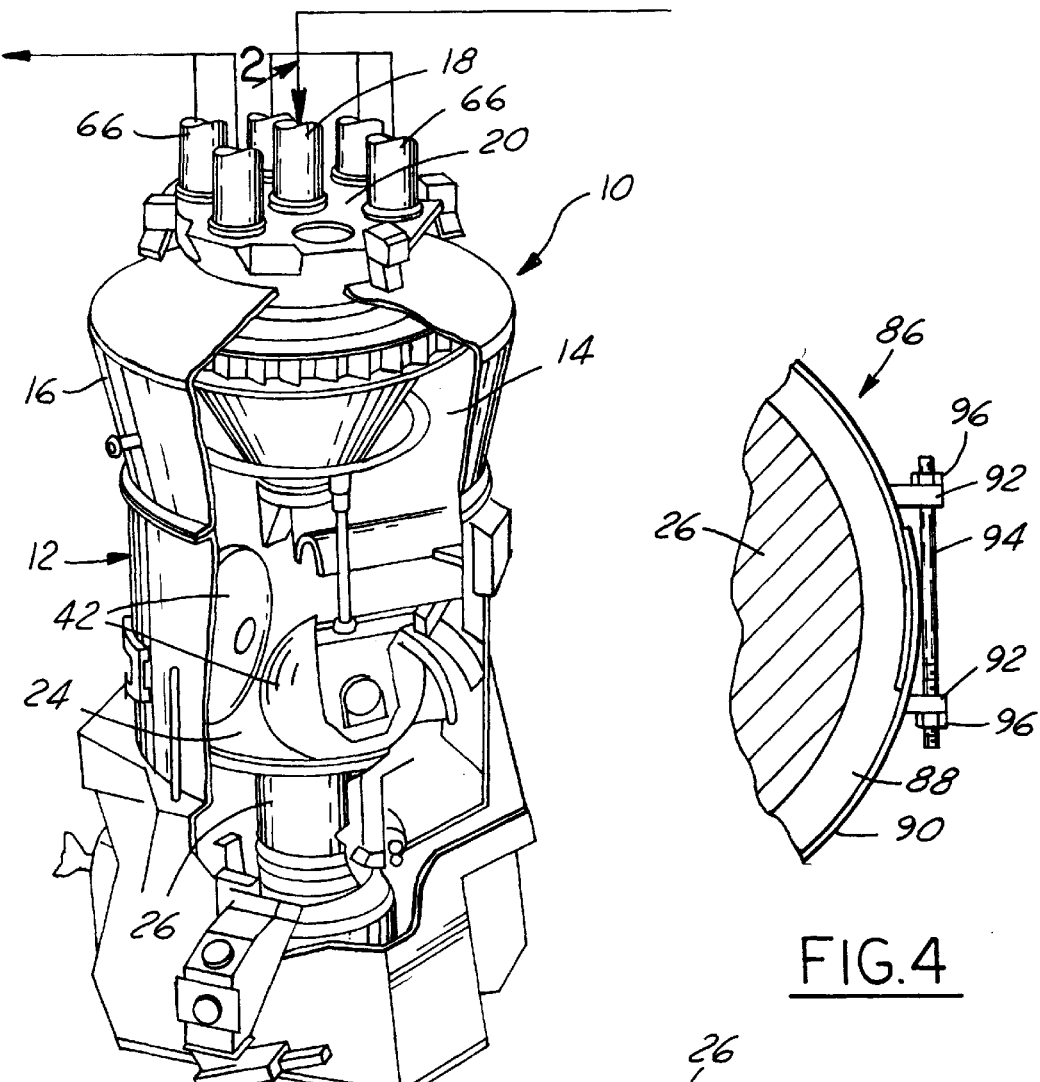
FIG.1
FIG.4
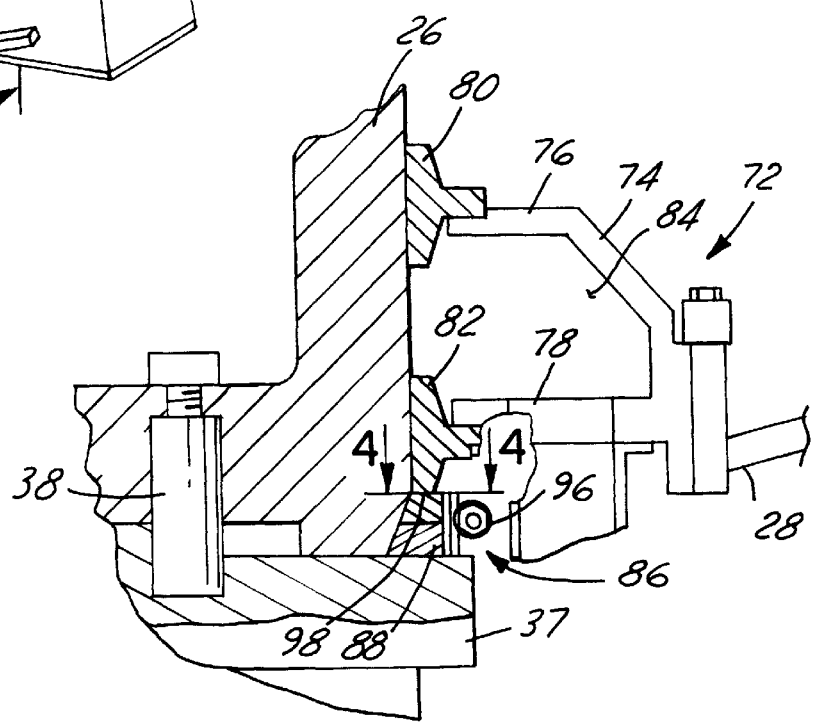
FIG.3

SEALING ASSEMBLY FOR A COAL PULVERIZER

FIELD OF THE INVENTION

This invention relates generally to coal pulverizers as used in the preparation of very fine particles of coal for combustion in boilers in power plants. More specifically, the invention relates to a supplemental packing for augmenting the seal between certain stationary and rotating elements in such pulverizers.

BACKGROUND OF THE INVENTION

Industrial pulverizers of the roll-and-race type typically have grinding elements or roll wheels fixed in relation to the vertical axis of the pulverizer which bear upon a rotating track on a grinding table. The table is part of a yoke which is driven through a gear box by an electric motor. The area where the yoke penetrates the outer stationary case or housing of the pulverizer is sealed, often with an assembly comprising two seals, preferably labyrinth seals, and a compartment for sealing air. Sealing air, at a pressure higher than the internal pressure of the pulverizer, is introduced into the compartment and is allowed to exhaust at a controlled rate, both to the atmosphere and into the lower chamber of the pulverizer. Sealing air is supplied from the same source to the seals in the roll wheels. Sealing air serves two purposes: first, it prevents pulverized coal dust from entering the atmosphere through the yoke seal, and, secondly, it prevents coal dust from entering the bearings in the roll wheels which would cause premature failure of the bearings. Wear in the lower labyrinth seal around the yoke allows an increasing leakage to atmosphere which diminishes the sealing air available to the roll wheels. Increased leakage to atmosphere also causes increased operating temperatures in the vicinity of the gear box and motor and pollutes the atmosphere with coal dust.

At the present time, the only remedy for a failed labyrinth seal is to replace it. Replacement involves removal of the roll wheels, yoke and grinding table from the pulverizer, and removal of the gear box from under the pulverizer to allow sufficient clearance to remove the yoke seal assembly. Critical alignment parameters are disturbed in the process of disassembly and removal of components to gain access to the seal.

SUMMARY OF THE INVENTION

In accordance with this invention, a supplemental packing material is provided for one of the labyrinth seals. The packing material is placed in a readily accessible position and preferably comprises a ring of compressible graphite and a band of steel or the like for tightening the packing around a lower extension of the yoke. The packing material is compressed against the extension of the yoke and into contact with a lip of the seal. An effective supplemental packing is thus provided which is especially useful after a period of use when the seal begins to wear. Replacement of the packing material can be accomplished simply and easily without having to remove the yoke and grinding table as well as the gear box under the pulverizer. A great deal of time and money is saved as a result.

The supplemental packing material of this invention provides a rapid and cost effective means of restoring and extending the life of the seal. It will also be understood that internal alignment of rotating parts in the pulverizer are not disturbed by the installation of the supplementary packing material and thus will not interfere with or affect the operation of any other pulverizer component. Of course, after extensive wear, the seal may still have to be replaced, but the effective life of the seal is greatly extended by the packing of this invention.

One object of this invention is to provide a supplemental packing material for a seal such as a labyrinth seal in a coal pulverizer having the foregoing features and capabilities.

Another object of the invention is to provide a packing assembly for the seal which is relatively inexpensive, is composed of a relatively few simple parts, is rugged and durable in use, and may be easily and quickly installed and replaced.

Other objects, features and advantages of the invention will become more apparent as the following description proceeds, especially when considered with the accompanying drawings.

BRIEF DESCRIPTION OF THE DRAWINGS

FIG. 1 is a perspective view with parts broken away of a coal pulverizer, having the sealing assembly supplemental packing of the present invention.

FIG. 3 is an enlargement of a portion of the coal pulverizer within the circle in FIG. 2, to better illustrate the supplemental packing of this invention.

FIG. 4 is a fragmentary sectional view taken on the line 4—4 in FIG. 3.

DETAILED DESCRIPTION OF THE PREFERRED EMBODIMENT

Figure 2:
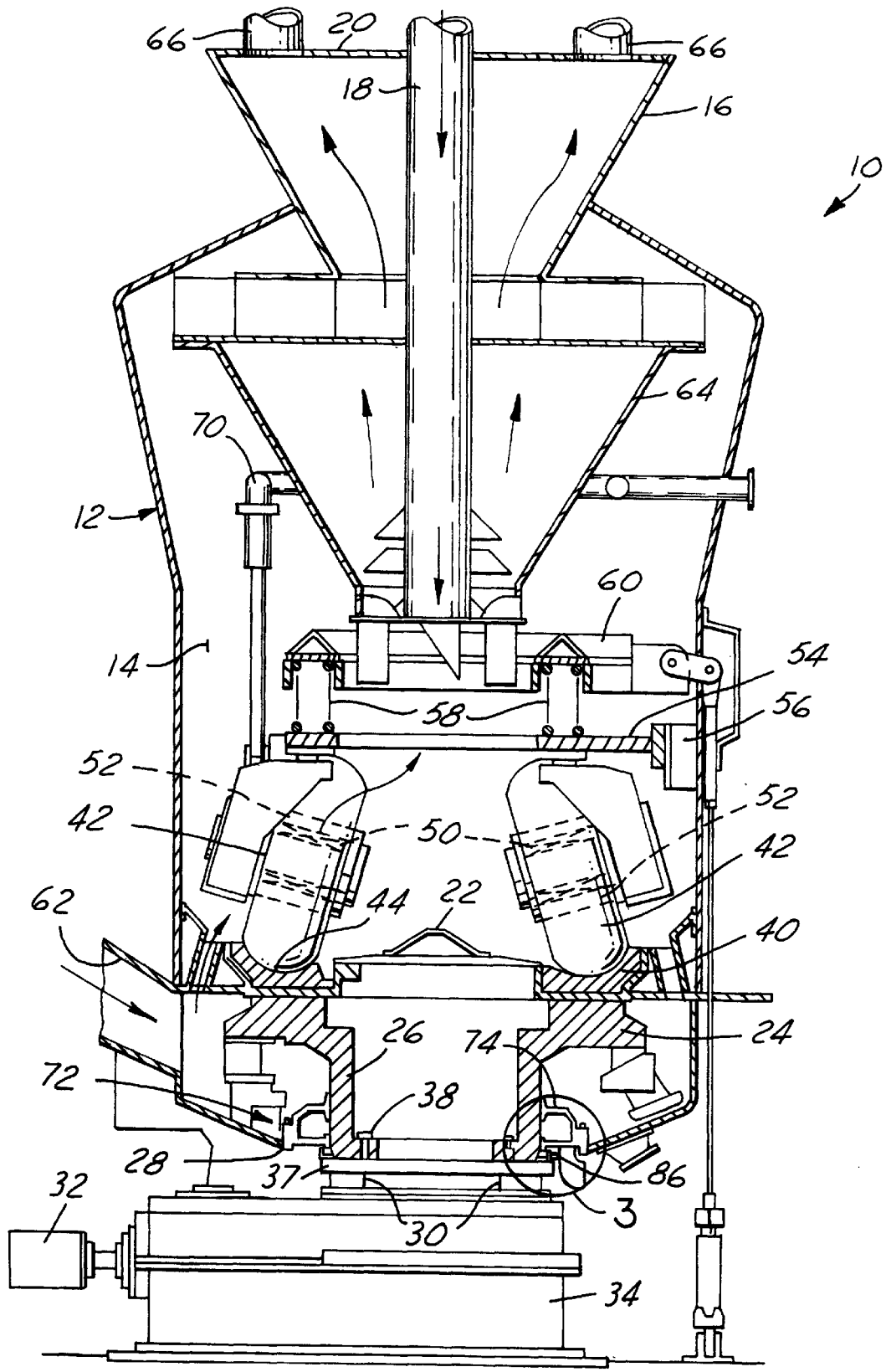
FIG. 2 is a sectional view of the coal pulverizer.

Referring now more particularly to the drawings, a coal pulverizer 10 is shown, comprising a housing 12 forming a chamber 14 in which coal is pulverized for use in the boiler of an electric power plant. The housing has a burner line bonnet 16 at the top. A vertical coal downspout 18 extends through the top wall 20 of the bonnet. Raw coal admitted through the open upper end of the downspout is discharged onto a dome-shaped cover cone 22 of a yoke 24.

The yoke 24 has a lower extension 26 which extends down through a central opening 28 in the bottom of the housing 12 and is supported for rotation on a vertical axis coinciding with the vertical centerline of the housing. The yoke 24 is supported for rotation by bearings 30.

The yoke is rotated by a motor 32. More specifically, the motor 32 has an output shaft extending into a gear box 34 and is geared to a vertical shaft. The shaft is secured to a plate 37 which is secured to the bottom of the yoke by fasteners 38.

The yoke has an annular ring 40 surrounding the cover cone 22. Free turning roll wheels 42 engage the concave top surface 44 of the ring 40 to pulverize coal that has been dropped on the cover cone and diverted radially outwardly onto the ring 40. The roll wheels are mounted for free rotation by bearings 50 mounted in journal housings 52 that in turn are installed beneath a pressure frame 54. The pressure frame 54 is mounted for vertical sliding movement by frame supports 56 secured to the housing and are pressed downwardly by compression springs 58 carried by a spring frame 60 suitably secured within the housing.

Hot air enters the housing through an air inlet 62 and rises upwardly, following the path of the arrows. The rising air passes through the cone classifier 64 and out through the burner lines 66 leading to the boiler burner deck. The flow of air carries with it the fine coal pulverized by the roll wheels. A seal air header 70 in the coal pulverizer housing directs seal air to the journal housings of the roll wheels.

A yoke seal assembly 72 is provided at the bottom of the housing 12 for sealing the space between the lower extension 26 of the yoke and the opening 28 in the bottom of the housing. The yoke seal assembly 72 is secured to the lower end of the housing 12 around the central opening 28 therein and comprises a hollow U-shaped ring 74 that opens radially inwardly. The yoke seal assembly 72 has upper and lower walls 76 and 78 which at their radially inner ends mount sealing elements 80 and 82 that bear against the lower extension 26 of the yoke. The sealing elements are preferably labyrinth seals. The compartment 84 within the ring 74 has hot sealing air pumped into it which helps in preventing the escape of hot air from the chamber of the coal pulverizer housing 12.

When the labyrinth seals wear, as they inevitably do after a certain period of use, air in the pulverizer housing 12 leaks out at the worn labyrinth seal. The leaking air carries with it the fine particles of coal which have been pulverized, creating an unhealthy environment. The air is very hot so that working conditions in the surrounding area become unbearable. Even minor wear of the labyrinth seals has in the past required that they be replaced, and to accomplish this it was necessary to remove the roll wheels 42, and lift and remove the yoke 24 and grinding table, and remove the gear box under the pulverizer to allow access to the seals. Critical alignment parameters were disturbed in the process. This is all very time consuming and costly.

In accordance with the present invention (see FIGS. 3 and 4), a supplemental packing 86 is provided for the lower labyrinth seal 82. The packing preferably consists of a ring 88 of packing material which is wrapped around the extension 26 of the yoke, just beneath the lower labyrinth seal 82. The packing material 88 is preferably compressible and excellent results have been achieved using graphite. A length of graphite is provided in strip form and is wrapped around the lower extension 26 of the yoke.

The packing ring 88 is clamped on the yoke extension 26 by a band 90 which encircles the packing ring. The ends of the band are overlapped and have abutments 92 welded thereto which are formed with openings to receive a long threaded rod 94. Nuts 96 applied to the opposite ends of the rod 94 are threaded up tight against the abutments 92 to draw the band 90 tightly around the packing ring. The packing ring is thereby compressed to the extent desired. The lower face of the graphite is pressed against the upper face of the plate 37, the radially inner face of the graphite is pressed against the surface of the lower extension 26 of the yoke, and the upper surface of the graphite is pressed against the lower lip 98 of the lower labyrinth seal. For example, a graphite packing ¾" in normal radial dimension may be squeezed to approximately ⅝" to achieve sufficient compression.

As a result, the packing material supplements the sealing action of the lower seal 82, even though seal 82 is somewhat worn, to prevent the escape of hot air from the housing 12 of the coal pulverizer. This greatly extends the effective life of the lower seal, so that replacement thereof is only necessary after a much longer period of time and extended wear.

The packing 88 is provided for the lower seal 82 only, since wear of the upper seal 80 is not so critical and slight leakage of the upper seal is more readily tolerated.

What is claimed is:

1. In a coal pulverizer for use in an electrical power plant, the coal pulverizer having coal pulverizing means including a yoke having a coal crushing table and rotatable within an air chamber defined by a housing enclosing the yoke, with an annular seal secured to the housing between an opening in the housing and an extension of the yoke projecting through the opening, the seal having sealing engagement with the yoke, the improvement comprising a packing secured to the extension of the rotatable yoke and pressing against the seal and against the extension of the yoke to provide a supplemental sealing action preventing leakage out of the air chamber.

2. The improvement defined in claim 1, wherein the packing comprises a ring of packing material surrounding the extension of the yoke, and further including a band surrounding the ring of packing material and clamping it to the extension.

3. The improvement defined in claim 2, wherein the ring of packing material is compressible, and further including adjustable means to tighten the band and compress the ring of packing material into tight sealing engagement both with the yoke extension and with the seal.

4. The improvement defined in claim 3, wherein the packing material is graphite.

5. The improvement defined in claim 4, wherein said ring of packing material is located in a readily accessible position for adjustment and/or replacement.

* * * * *